United States Patent [19]

Sugisaki et al.

[11] Patent Number: 4,562,992

[45] Date of Patent: Jan. 7, 1986

[54] SEAL DEVICE FOR GATE VALVE

[75] Inventors: Kenzaburo Sugisaki; Mutsuro Onoda, both of Tokyo, Japan; Hajime Ishimaru, 128-102, 2-chome, Namiki, Sakuramura, Niihara-gun, Ibaraki-ken, Japan

[73] Assignees: Fuji Seiko Kabushiki Kaisha, Tokyo; Hajime Ishimaru, Ibaraki, both of Japan

[21] Appl. No.: 659,412

[22] Filed: Oct. 10, 1984

[30] Foreign Application Priority Data

Dec. 26, 1983 [JP] Japan ................. 58-244231

[51] Int. Cl.⁴ ............................. F16K 25/00
[52] U.S. Cl. ................... 251/159; 251/167; 251/172; 251/328; 251/368; 267/74
[58] Field of Search ............. 251/158, 159, 167, 171, 251/172, 173, 328, 368; 267/74

[56] References Cited

U.S. PATENT DOCUMENTS

| | | | |
|---|---|---|---|
| 1,047,491 | 12/1912 | Bliss | 267/74 |
| 1,788,373 | 1/1931 | Anderson | 267/74 |
| 3,391,901 | 7/1968 | Wheeler | 251/157 X |
| 3,684,239 | 8/1972 | Schwartzbart | 251/173 |
| 3,770,009 | 11/1973 | Miller | 251/368 X |
| 4,415,139 | 11/1983 | Potts | 251/328 X |

FOREIGN PATENT DOCUMENTS 0114065  7/1982  Japan ..................... 251/328

Primary Examiner—Harold W. Weakley
Attorney, Agent, or Firm—George B. Oujevolk

[57] ABSTRACT

A seal device for a gate valve is disclosed, in which annular members facing the front and rear surfaces of a gate valve member having a through hole are coupled to a valve cage by inner and outer bellows, each of the annular members has an annular recess formed on the side facing the gate valve member and closed by an annular mirror surface finished thin plate secured by welding to an opening thereof, the individual bellows are elongated by fluid under pressure supplied into annular spaces defined by the inner and outer bellows, and the annular mirror surface finished thin plates are strongly urged against the gate valve member by the pressure of the fluid forced from the annular spaces into the annular recesses. Edge portions of the annular mirror surface finished thin plates are to be very firmly mounted to the annular members, and the mechanical strength of the thin plates is to be increased. The two annular mirror surface finished thin plates are to be simultaneously brought into contact with the front and rear surfaces of the gate valve member, and are to be urged against the gate valve member with a uniform pressure over the entire circumference.

2 Claims, 6 Drawing Figures

SEAL DEVICE FOR GATE VALVE

BACKGROUND OF THE INVENTION

1. Field of the Invention

This invention relates to a seal device for a gate valve used for sealing ducts of various vacuum apparatus and vacuum vessels.

2. Description of the Prior Art

As a seal device for a gate valve, there has been one, in which annular members facing the front and rear surfaces of a gate valve member having a through hole are coupled to a valve cage by inner and outer bellows, each of the annular member has an annular recess formed on the side facing the gate valve member and closed by an annular mirror surface finished thin plate secured by welding to an opening thereof, the individual bellows are elongated by fluid under pressure supplied into annular spaces defined by the inner and outer bellows, and the annular mirror surface finished thin plates are strongly urged against the gate valve member by the pressure of the fluid forced from the annular spaces into the annular recesses (as disclosed in Japanese Utility Model Laid-open No. Sho 58-102,879).

This prior art seal device for a gate valve, however, has the following problems. The welded edge portions of the annular mirror surface finished thin plate coupled to the annular member has low mechanical strength and liable to be ruptured when great stress concentration is produced in them with swelling deformation of the annular mirror surface finished thin plate caused by the application of a high pressure to the back side thereof.

In addition, it is likely that the opposite side annular mirror surface finished thin plates fail to be brought into contact with the gate valve member perfectly and when the gate valve is closed. In such a case, the pressures applied to the front and rear surfaces of the gate valve member will be out of balance. Besides, it is likely that the annular mirror surface finished thin plates fail to be urged against the gate valve member with a uniform pressure over the entire circumference. The lack of uniformity of the urging pressure will lead to a partial load on the seal section, thus leading to the rupture of thereof.

Further, when the opposite side annular mirror surface finished thin plates are separated from the gate valve member, they are liable to be brought to positions forming different gaps with respect to the gate valve member. This is thought to be attributable to fluctuations of the precision of fabrication and installation of the bellows.

BRIEF DESCRIPTION OF THE INVENTION

A first object of the present invention is to provide a seal device for a gate valve of the type, in which annular members facing the front and rear surfaces of a gate valve member having a through hole are coupled to a valve cage by inner and outer bellows, each of the annular member has an annular recess formed on the side facing the gate valve member and closed by an annular mirror surface finished thin plate secured by welding to an opening thereof, the individual bellows are elongated by fluid under pressure supplied into annular spaces defined by the inner and outer bellows, and the annular mirror surface finished thin plates are strongly urged against the gate valve member by the pressure of the fluid forced from the annular spaces into the annular recesses, the seal device being characterized in that each of the annular mirror surface finished thin plates has edge portions of a large diameter secured by welding to the associated annular member.

This device permits the edge portions of the annular mirror surface finished thin plates to be very firmly welded to the annular members. Thus, even when swelling deformation of the mirror surface finished thin plates is caused by a high pressure acting on their back surface, no great pressure concentration will be produced in the welded edge portions of the mirror surface finished thin plates, so that it is possible to eliminate the possibility of rupture of the welded edge portions of the mirror surface finished thin plates. In addition, because of the considerable thickness of the edge portions of the mirror surface finished thin plates, they will never be ruptured even if the mirror surface finished thin plates are urged against the gate valve member with a considerably high pressure.

A second object of the present invention is to provide a seal device for a gate valve of the type noted, which is characterized in that a plurality of tension coil springs are provided in each of the annular spaces at a uniform interval in the circumferential direction of the annular space, each tension coil spring having one end secured to the associated annular member and having a tension adjustment threaded rod secured to the other end and penetrating the corresponding end wall of the valve cage, a tension adjustment nut being screwed on the threaded rod outwardly projecting from the end wall.

With this device, the tension of the individual tension coil springs is preliminarily adjusted by merely turning the tension adjustment nuts. Thus, it is possible to permit the front and rear annular mirror surface finished thin plates to be urged against the opposite sides of the gate valve member simultaneously and with a uniform pressure over the entire circumference by supplying fluid under pressure into the front and rear annular spaces.

A third object of the present invention is to provide a seal device for a gate valve of the type noted, in which the annular mirror surface finished thin plates having the large thickness edge portions is made of a soft metal such as aluminum or an aluminum alloy.

Thus, each annular mirror surface finished thin plate is to be urged against the gate valve member over the entire circumference even if small foreign particles are caught between it and the gate valve member.

A fourth object of the present invention is to provide a seal device for a gate valve of the type noted, in which each annular mirror surface finished thin plate having the large thickness edge portions has an annular recess formed by an electrolytic dissolution process on the side facing the associated annular member in an intermediate portion of it.

The annular mirror surface finished thin plates having the large diameter edge portions thus are to be readily fablicated.

The above-mentioned and other objects and features of the invention will become apparent from the following detailed description taken in conjunction with the drawings which indicate an embodiment of the present invention.

DESCRIPTION OF PREFERRED EMBODIMENTS

Figure 1:
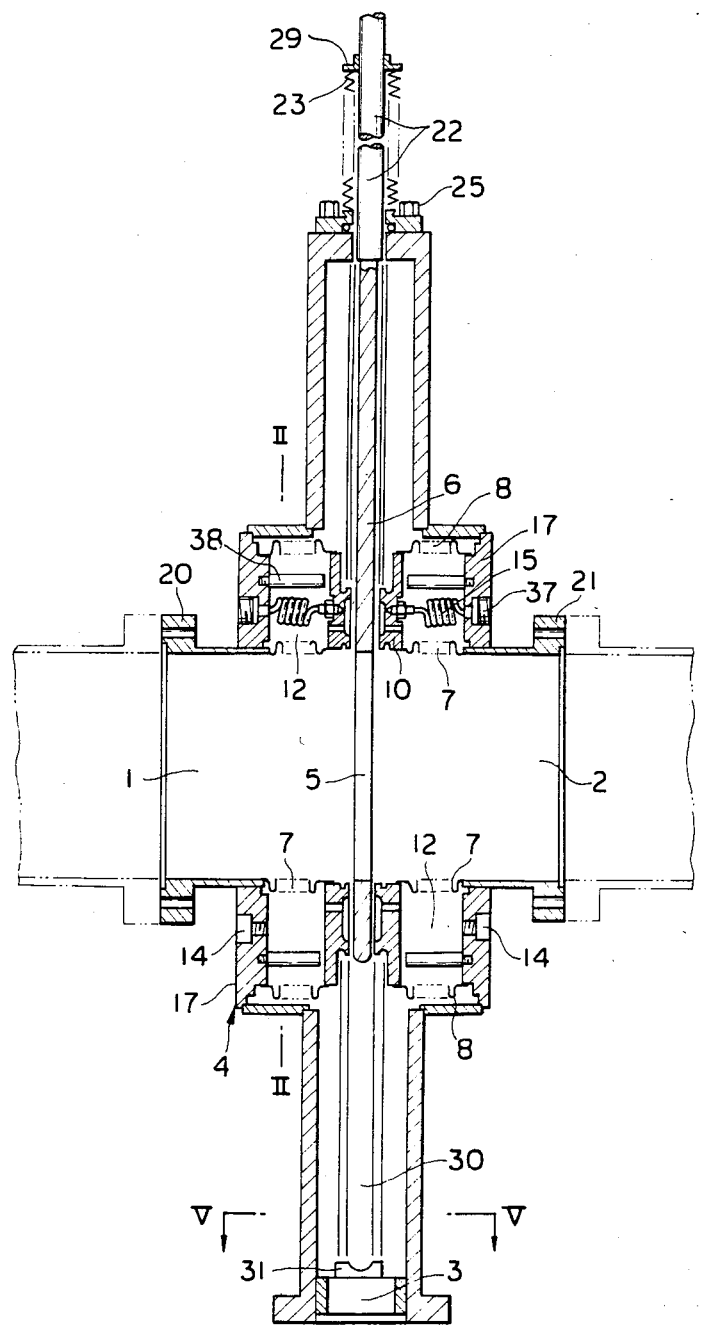
FIG. 1 is a longitudinal cross-sectional view showng a gate valve.
Figure 2:
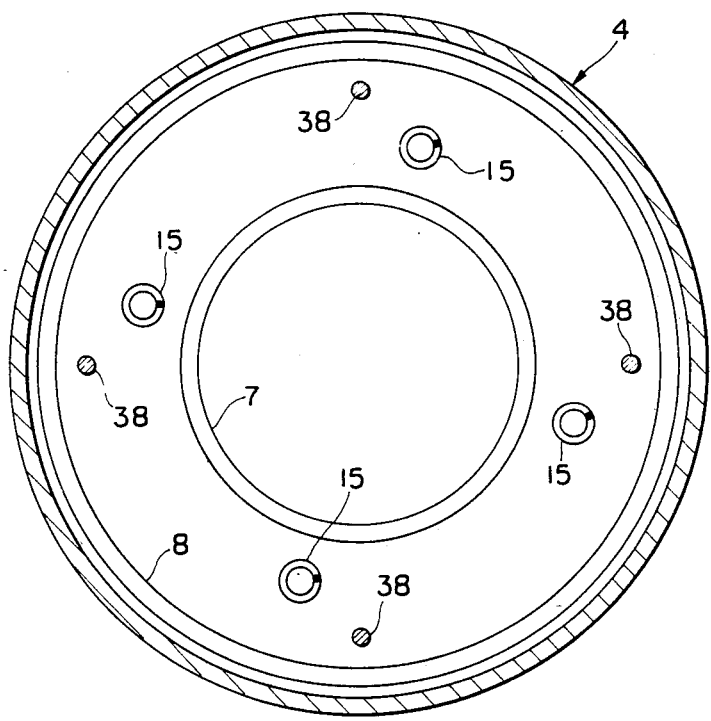
FIG. 2 is a cross-sectional view, to an enlarged scale, taken along line II—II in FIG. 1.
Figure 3:
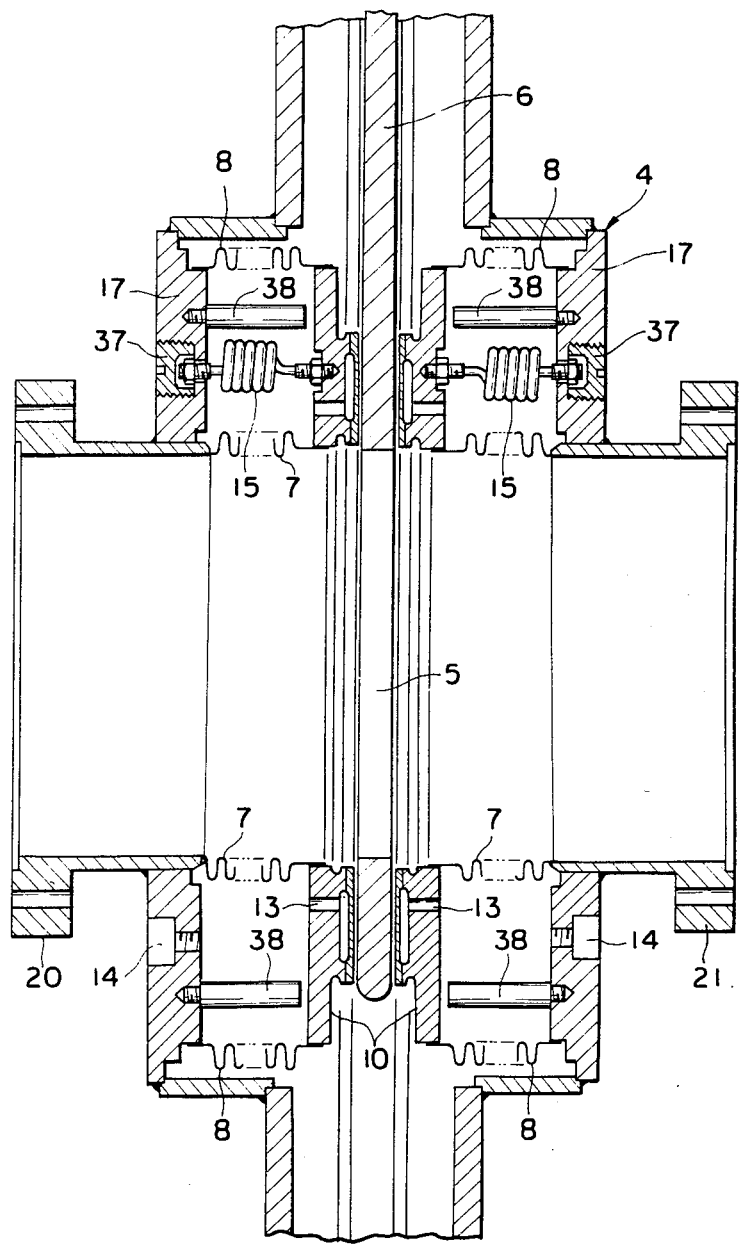
FIG. 3 is a longitudinal cross-sectional view, to an enlarged scale, showing part of the gate valve shown in FIG. 1.
Figure 4:
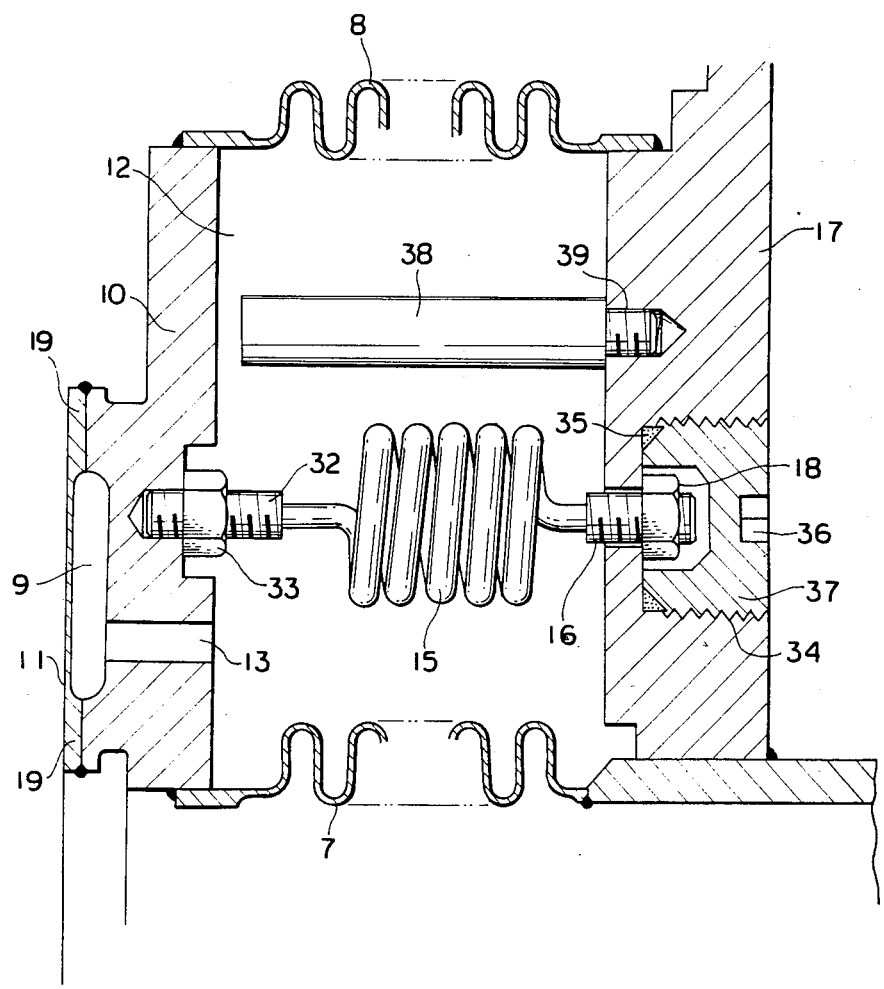
FIG. 4 is a longitudinal cross-sectional view, to an enlarged scale, showing a tension spring and a stopper provided between inner and outer bellows.
Figure 6:
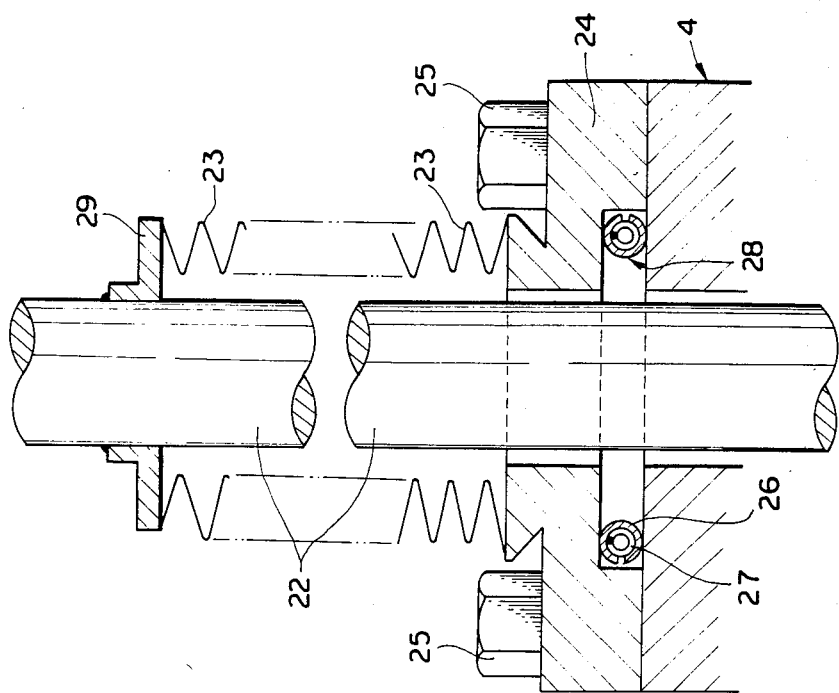
FIG. 6 is a longitudinal cross-sectional view, to an enlarged scale, showing a seal section between a joint rod and a valve cage.
Figure 5:
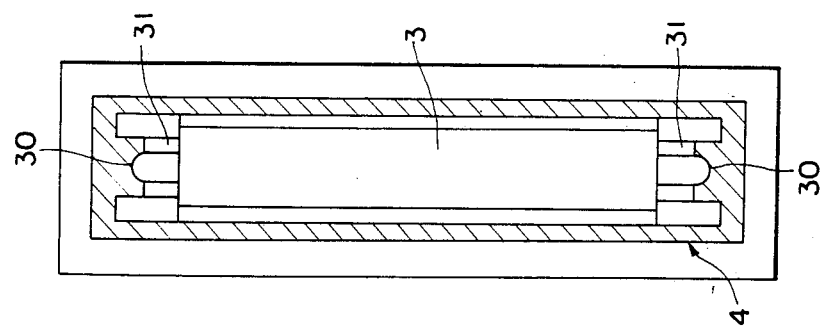
FIG. 5 is a cross-sectional view, to an enlarged scale, taken along the line V—V in FIG. 1.

The drawings illustrate an embodiment of the present invention. A valve cage 4 having an intermediate exhaust port 3 connected to an evacuating pump, is provided with front and rear openings 1 and 2 provided with respective coupling flanges 20 and 21. The front and rear openings 1 and 2 are coaxial with each other and are connected to duct lines of vacuum apparatus, vacuum vessel or the like.

A metal gate valve member 6, which has mirror surface finished front and rear surfaces and a through hole 5 permitting an electron beam or the like to pass therethrough, is disposed in a central portion of the valve cage 4. A joint rod 22 is secured at one end to a stem of the gate valve member 6. A metal seal bellows 23 is fitted on the joint rod 22. It has one end welded to a flange 24, which is secured by bolts 25 to the valve cage 4. A ring-like metal seal member 28 is provided in an annular space defined between the flange 24 and valve cage 4. It includes a hollow ring-like seal body 26 made of an aluminum alloy and having a slit and a solenoidal pressure-bearing metal spring 27 accommodated in the seal body 26. It is urged against the valve cage 4 and flange 24 by the clamping force of the bolts 25.

A ring-like member 29 is secured by welding to the other end of the seal bellows 23. It is fitted on and hermetically secured by welding to the joint rod 22. The joint rod 22 is coupled to a piston rod of an oil hydraulic cylinder (not shown) for driving the gate valve member.

The opposite side inner walls of the valve cage 4 are formed with guide grooves 30, in which the opposite side edges of the gate valve member 6 are received. The intermediate exhaust port 3 in the valve cage 4 is provided with an integral stopper 31 having a groove of an arcular sectional profile, in which an end of the gate valve member having an arcular sectional profile is detachably received.

Cylindrical inner and outer bellows 7 and 8 are provided in portions of the valve cage 4 on opposite sides of the gate valve member 6 and surrounding the front and rear openings 1 and 2. The ends of the inner and outer bellows 7 and 8 on the gate valve member side, are secured by welding to corresponding annular members 10 facing the front and rear surfaces of the gate valve member 6. Each annular member 10 has a shallow annular recess 9 facing the gate valve member 6. An annular, mirror surface finished thin plate 11 of aluminum or an aluminum alloy is provided on the side of the annular member 10 facing the gate valve member. The thin plate 11 has outer and inner edge portions 19 with a thickness of 0.2 to 0.4 mm and an intermediate portion with a thickness of about 0.1 mm between the outer and inner edge portions. The thickness edge portions 19 of the thin plate 11 are secured by welding to the annular member 10, and the open side of the annular recess 9 is closed by the thin plate 11 having the thickness edge portion 19. The other ends of the bellows 7 and 8 are secured by welding to the front and rear walls 17 of the valve cage 4.

The annular member 10 has a plurality of radially spaced-apart communication holes 13 which communicate an annular space 12 defined between the bellows 7 and 8 and the annular recess 9. The end wall 17 of the valve cage 4 has a plurality of radially spaced-apart pressure application ports 14 open to the annular space 12. Pressure supply/exhaust tubes are connected to the pressure application ports 14 for supplying and exhausting fluid under pressure.

A plurality of tension coil springs 15 (four of them being shown) are provided in the annular space 12 at a uniform interval in the circumferential direction. Each tension coil spring 15 is made of steel. It has a threaded rod 32 secured by welding to one end and screwed in the annular member 10. A lock nut 33 is screwed on the threaded rod 32 and urged against the annular member 10. The tension coil spring 15 also has a tension adjustment threaded rod 16 secured by welding to the other end and extending through the end wall 17 of the valve cage 4 into a female threaded recess 34 formed therein. A tension adjustment nut 18 is screwed on a portion of the threaded rod 16 extending in the recess 34.

An O-ring 35 is provided at the bottom of the female threaded recess 34, and a box-like seal cap 37 having a male thread formed on the outer periphery is screwed in the female threaded recess 34. The seal cap 37 has a rotary tool engagement recess 36 formed on the outer end. The O-ring 35 is compressed by tightening the seal cap 37.

A plurality of rod-like stoppers 38 (four of them being shown) are provided in the annular space 12 at a substantially uniform interval in the circumferential direction. Each stopper 38 has a threaded rod 39 formed at one end, and it is secured to the end wall 17 with the threaded rod 39 screwed therein.

With this embodiment of the gate valve, when fluid under pressure, e.g., compressed air, is not present in the annular spaces 12, the annular members biased toward the end walls 17 are held in engagement with the corresponding ends of the stoppers 38. In this state, a gap is formed between each side of the gate valve member 6 and the associated mirror surface finished thin plate 11, so that the gate valve member 6 is to be freely moved relative to the valve cage 4.

To evacuate the duct line, fluid under pressure (4 to 8 kg/cm$^2$) is supplied to the annular spaces 12 from the pressure application ports 14 with the gate valve member 6 held in a position such that its through hole 5 is in register with the openings 1 and 2 of the valve cage 4 as shown in FIG. 1. The pressure of the supplied fluid causes elongation of the bellows 7 and 8 against their resistance against elongation and also the biasing force of the tension coil springs 15. The mirror surface finished thin plates 11 that are secured to the annular members 10 on the front and rear surfaces of the gate valve member, are eventually brought into contact with and urged against the front and rear surfaces of the gate valve member 6. At this time, the fluid under pressure supplied into the annular spaces 12 is also forced through the communication holes 13 into the annular recesses 9 closed by the mirror surface finished annular thin plates 11. The thin plates 11 are thus urged against the portions of the front and rear surfaces of the gate valve member 6 surrounding the through hole 5 thereof by the fluid under pressure in the annular recesses 9, so that vacuum in the duct is to be assured.

To release the hermetical coupling of the duct sections, the pressure in the annular spaces 12 is reduced to zero or a negative pressure, thereby forming a gap between each side of the gate valve member 6 and each annular mirror surface finished thin plate 11.

To block the duct lines, the portion having no through hole 5 in the gate valve member 6 faces the mirror surface finished thin plate 11. Then, each of bellows 7 and 8 is elongated as mentioned above and each mirror surface finished thin plate 11 may be urged against the gate valve member 6.

The fluid supplied into the annular spaces 12 may be either gas or liquid. Also, as the means for moving the gate valve member 6, any suitable driving means may be utilized in lieu of the oil hydraulic cylinder as well.

The mirror surface finished thin plate 11, which has the inner and outer edge portions 19 having a large thickness, may be readily fablicated by treating the back surface of an intermediate portion of an annular member of aluminum or an aluminum alloy by an electrolytic dissolution (etching) treatment.

In the above embodiment, a plurality of stoppers 38 are secured in a circumferentially uniformly spaced-apart arrangement to each end wall 17 of the valve cage 4 such that they face each annular member 10, so that a uniform open gap is to be obtained between each mirror surface finished annular thin plate 11 and gate valve member 6 when the thin plate 11 is displaced away from the gate valve member 6 by removing pressure from each annular space 12.

One end of the tension coil springs 15 may be secured to the annular member 10 by welding or by any other suitable securing means.

What is claimed is:

1. A gate valve sealing arrangement, comprising in combination:
    (a) a valve cage (4) with an outer structure and a hollow cylindrical inner chamber, said inner chamber having coaxial rear and front openings (1, 2), said rear and front openings defining a flow path, also, outer wall members (17) around the chamber;
    (b) a gate valve member (6), with parallel flat front and rear surfaces, said gate valve member (6) being disposed to move in a direction normal to the defined flow path substantially across the center of said chamber, also, said gate valve member (6) having a through aperture (5);
    (c) annular members (10), one annular member being disposed on each side of the gate valve member (6) and spaced apart from said outer wall members (17), the annular members (10) each having an annular recess (9) with an open side facing the gate valve member (6);
    (d) inner and outer bellows (7, 8) in the valve cage (4) on opposite sides of the gage valve member (6) around the outer structure of the valve cage (4), said inner and outer bellows (7, 8,) being spaced apart from each other and having inner and outer ends, the inner ends being coupled to the annular member (10), the outer ends being connected to the outer wall members (17) so that the outer wall members (17), the annular members (10), and the inner and outer bellows (7, 8) define annular open spaces (12) around the valve cage outer structure;
    (e) first and second aligned retaining means (37, 16, 32, 33) intermediate said inner and outer bellows, the first retaining means being connected to said outer wall members (17), the second retaining means being connected to said annular members (10), inwardly biasing spring means (15) held by said retaining means, stoppers (38) partially extending from one of said members (10,17) towards the other of said members preventing the collapse of the annular members (10) towards the outer wall members (17), a communication aperture (13) in each of said annular members extending from its annular recess (9) to the annular open spaces (12), pressure application ports (14) in the valve cage (4) open to the annular open spaces (12);
    (f) a thin plate (11) having an annular mirror surface finish on the side of each annular member (10) facing the gate valve member (6), said thin plate (11) closing the open side of said annular recess (9); and,
    (g) thick edge portions (19) around the annular mirror surface finish of the thin plate (11) so affixing the thin plate to the annular member (10) that the total surface of the mirror surface finish thin plate (11) closing the opening of the annular recess (9) is parallel to the flat front and rear surfaces of the gate valve member (6).

2. A sealing arrangememt for a gate valve according to claim 1 wherein said spring means (15) consist of a plurality of tension coil springs in a spaced-apart arrangement in the circumferential direction of the annular space (12), the ends of each of said coil springs being connected to said retaining means, the first of said retaining means having a tenson adjustment threaded rod (16) secured to said coil spring end, and threaded into the wall member (17) with a tension adjustment nut (18) threaded onto said threaded rod (16).

* * * * *